May 23, 1967  J. W. JUVINALL ETAL  3,320,975
SERIALLY ARRANGED VALVES
Original Filed March 14, 1960  3 Sheets-Sheet 1

INVENTORS
JAMES W. JUVINALL
CHESTER A. PURDY
BY Hofgren, Brady, Wegner
Allen and Stellman
Attorneys

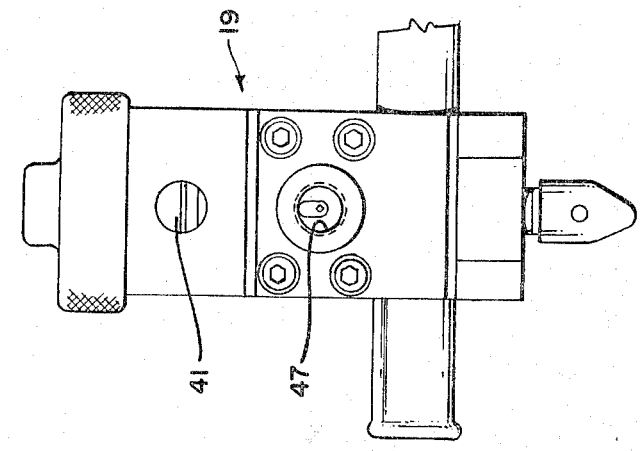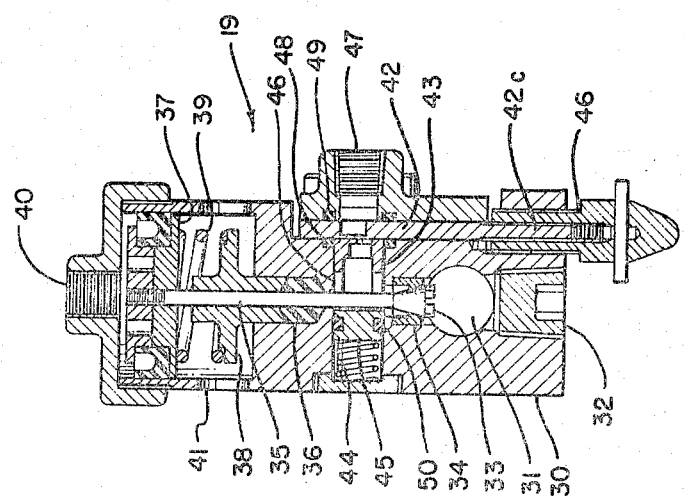

May 23, 1967  J. W. JUVINALL ETAL  3,320,975
SERIALLY ARRANGED VALVES
Original Filed March 14, 1960  3 Sheets-Sheet 2
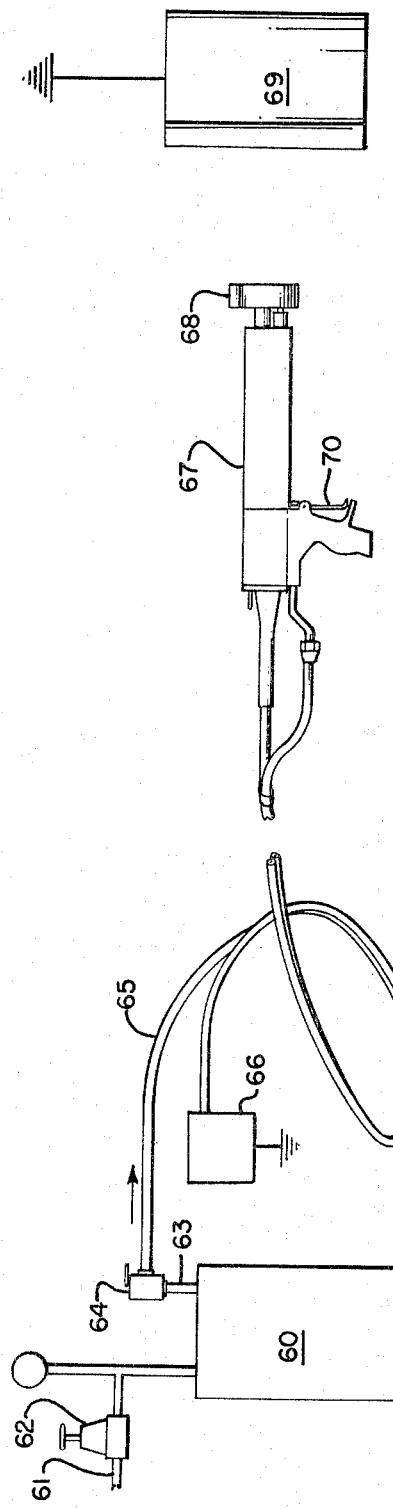
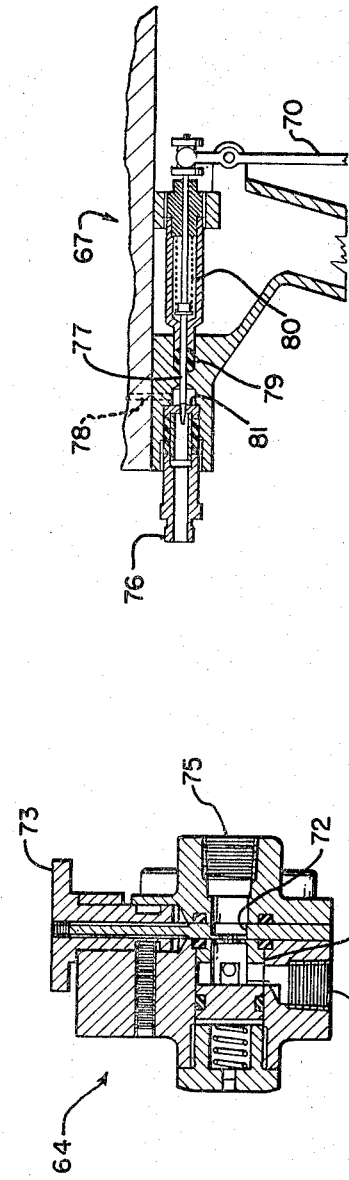
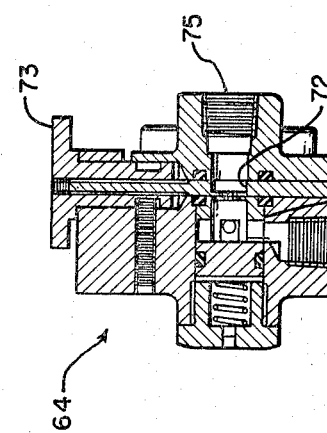
INVENTORS
JAMES W. JUVINALL
CHESTER A. PURDY
Attorneys

United States Patent Office 3,320,975
Patented May 23, 1967

3,320,975
SERIALLY ARRANGED VALVES
James W. Juvinall, Indianapolis, Ind., and Chester A. Purdy, Belmont, Wis., assignors to Ransburg Electro-Coating Corp., a corporation of Indiana
Continuation of application Ser. No. 14,752, Mar. 14, 1960. This application June 10, 1966, Ser. No. 556,779
5 Claims. (Cl. 137—613)

This is a continuation of application Ser. No. 14,752, filed Mar. 14, 1960, and now abandoned.

This invention relates to a spray coating system, and more particularly to an improved system for controlling the rate of atomization of a liquid coating material, as in an electrostatic painting system.

In certain operations using a flow of liquid under pressure, as for example production line electrostatic spray painting, it may be desirable to vary the rate of atomization of the liquid, as for example when painting a different surface area, or when it is desired to change the thickness of the film deposited on the article surface. In automatic production line electrostatic spray painting, once the proper atomization rate has been determined for a given type of article, it is desirable that this atomization rate remain unchanged. However, changes in temperature of the paint caused by changes in ambient temperature, or changes in the amount or type of solvent, may make appreciable changes in viscosity of the paint being sprayed.

One feature of this invention is that it materially minimizes changes in liquid flow in the system which might otherwise occur as a result of changes in viscosity of the liquid, providing a control system which is relatively insensitive to viscosity changes;

Another feature of this invention is that it provides a flow control orifice which is "open," in the sense that there is no central needle valve member, and yet which may be adjustable to regulate the rate of flow of liquid therethrough at a given liquid pressure;

Yet another feature of this invention is that the control orifice has no dimension transverse to the direction of liquid flow which is more than a couple of dozen times the other dimension transverse to the direction of liquid flow, preferably no such dimension being more than a few times the other dimension, the best results being attained when the dimensions are about equal, as in an opening which is generally circular or relatively square;

A still further feature of this invention is that the system provides positive control of the rate of atomization of the liquid from the atomizing device, yet eliminates the need for positively acting pumps and fluid regulators heretofore used in the liquid lines; and Yet another feature of this invention is that the adjustable orifice element is small in size, so that a plurality of such elements can be placed relatively close to the atomizing device where a plurality of liquid feeds are provided therefor, as in remotely controlled color change systems used in painting.

Other features and advantages of this invention will be apparent from the following specification and drawings, in which:

FIGURE 2 is a vertical sectional view of an improved valve forming part of the flow control system here disclosed;

FIGURE 3 is an elevational view of the valve shown in FIGURE 2, looking from the right of such figure;

FIGURE 4 is a detailed fragmentary view showing the way in which the effective orifice size of the adjustable orifice is varied;

FIGURE 5 is an illustration in diagrammatic form of another type of electrostatic painting system utilizing this invention;

FIGURE 6 is a vertical sectional view of another form of adjustable orifice valve; and FIGURE 7 is a fragmentary vertical sectional view of a portion of the hand spray gun shown in FIGURE 5.

Figure 1:
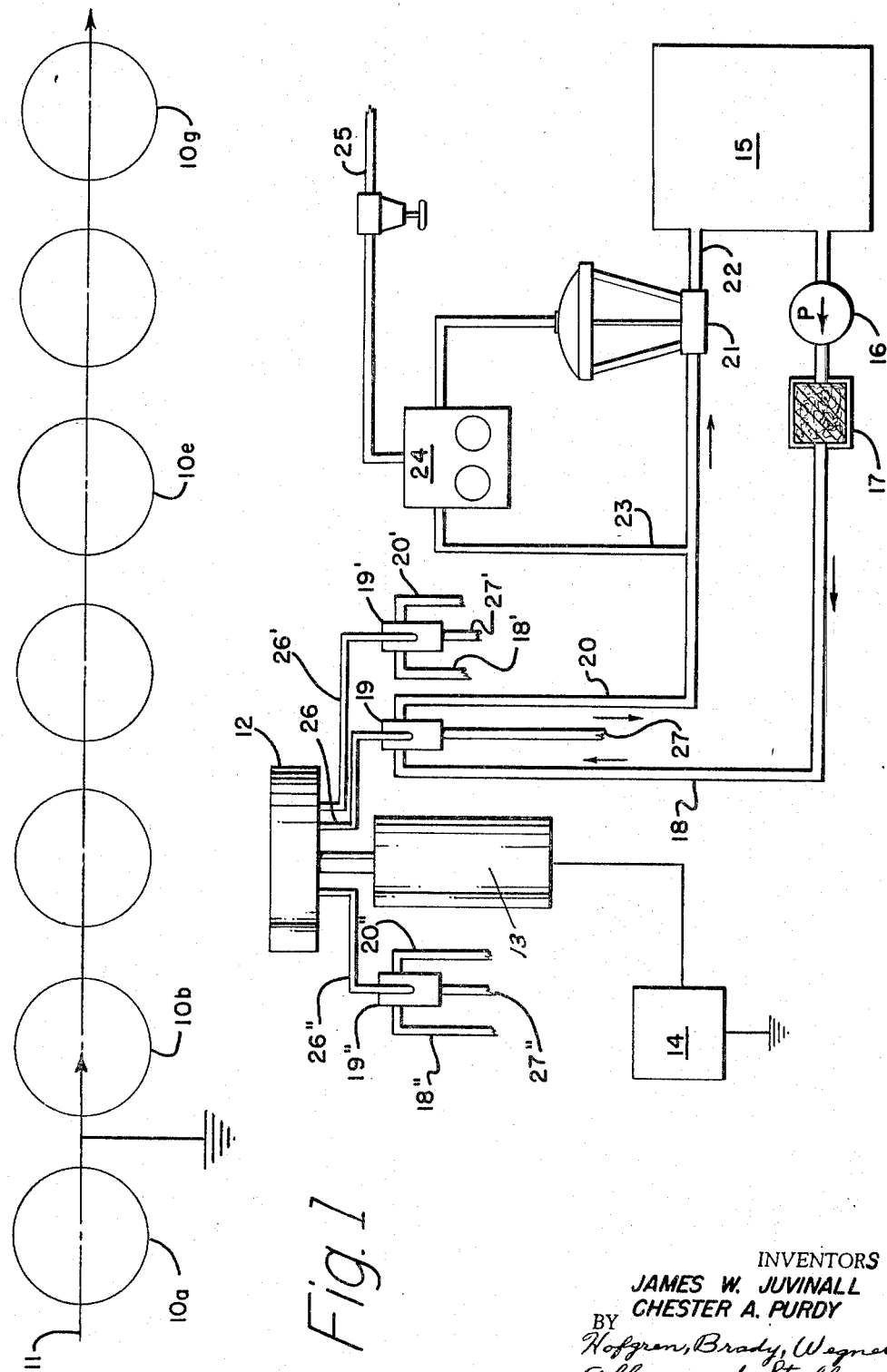
FIGURE 1 is an illustration in diagrammatic form of one type of electrostatic painting system utilizing this invention.

Referring now more particularly to FIGURE 1, a representative electrostatic spray painting system utilizing this invention is illustrated, one wherein change of color of the paint being applied may be remotely controlled by suitable means. A plurality of articles 10, as the articles 10a–10g illustrated, are grounded through and carried by a conveyor 11 which moves them at a predetermined rate from left to right, as the parts are illustrated in this figure. At a suitable distance from an article surface as it passes through the spray zone, as 10 inches therefrom, is a rotating electrostatic atomizing device 12. This atomizing device is adapted to be rotated by the motor 13 and to have a high potential electrostatic field created between its edge and the article surface it confronts by a high potential power supply 14. When paint is supplied to the atomizing device the field atomizes the paint into a spray of fine, charged particles which are then electrostatically deposited, while still liquid, on the article in the spray zone.

The particular system illustrated in FIGURE 1 is of the paint recirculating type. Paint in a paint reservoir 15 is forced by pump 16 through filter 17 and along pipe 18 through valve 19. Paint then returns through pipe 20, back pressure regulating valve 21 and pipe 22 to the paint reservoir 15. A pressure sensing conduit 23 is in communication with the pipe 20 ahead of the back pressure regulating valve 21, and this conduit 23 provides pressure to a pressure control unit 24. This control unit operates through air under pressure supplied from line 25 to regulate the amount of restriction provided by back pressure valve 21, operating to maintain a desired pressure in the paint recirculating pipes at all times.

As will be described in more detail in connection with subsequent figures, the valve 19 provides means for initiating and terminating paint flow through the feed tube 26 to the atomizing device 12, and for regulating the rate of such flow. A system is thus provided wherein paint at a predetermined desired pressure can flow through the valve 19 to supply paint to the atomizing device at a desired rate of flow, this flow being initiated and terminated from a remote location by admitting air under pressure through the pipe 27, or releasing air therefrom. In order to enable different paints, as paints of different color, to be supplied to the atomizing device 12 selectively as desired, additional valves 19' and 19" are illustrated. Paint at a desired pressure is suppplied to each of these other valves by separate recirculating systems similar to the one just described, paint flowing toward the valve 19' through pipe 18' and returning through pipe 20', valve 19" similarly having paint supplied to it through the pipe 18" and returned to its paint reservoir through the pipe 20". When the valve 19' is opened by admitting air through the control pipe 27' it delivers a different paint through the feed tube 26' to the atomizing device 12; and when air is admitted to the control pipe 27' valve 19" supplies still a different paint through the feed tube 26" to the atomizing device. It will thus be seen that the valves may be controlled from a remote point to provide any selected one of three paints, the particular paint desired being selected from a control station at any desired distance from the atomizing device. While only three valves and paint systems are illustrated in the drawing, this is for clarity of illustration; and it will be understood that a dozen or more feed tubes and valves could in practice be associated with a single atomizing device to provide as many different paints as might be desired.

Referring now more particularly to FIGURES 2 and 3, the valve 19 is shown in detail. It utilizes a housing 30 in which are contained both an adjustable flow regulating orifice and a remotely controllable on-off valve. Pipes 18 and 20 connect to the flow passageway 31 extending through the lower part of the housing, so that paint at the desired pressure is available in this passageway 31 at all times when the recirculating system is in operation, a removable plug 32 being normally sealed in place as shown.

Immediately above this plug and at the top of the passageway 31 is the on-off valve member 33, here shown as seated on a seat member 34 here illustrated as an insert of suitable material, as nylon or Delrin 500X. The valve member 33 is carried by a valve stem 35 extending slidably through packing means 36 and connected at its upper end to an operating piston 37, this piston being vertically movable in and suitably sealed with respect to the walls of the cylindrical upper portion of the housing 30. A member 38 in the housing above the packing material 36 serves as a gland member and as a support for the spring 39 normally urging the piston 37 to the uppermost position, as shown in FIGURE 2. A fluid opening 40 at the top of the valve housing is adapted to be connected to a controllable source of fluid under pressure, as the air line 27 illustrated in FIGURE 1, to provide remote control for the on-off valve 33. Under the effect of the spring 39, this valve 33 remains in the closed position illustrated until air under pressure is delivered to the opening 40, whereupon the piston is depressed and the valve 33 opened as long as sufficient fluid pressure is present. Openings 41 in the side wall of the housing beneath the piston prevent the trapping of air underneath the piston and enables free movement thereof upon the remote actuation of the device; and the openings provide outlets for paint, if the packing 36 should fail, preventin any chance of damage to the piston 37 and its packing.

An adjustable orifice flow regulating valve is also contained in the valve housing, and comprises as its primary parts a vertically slidable plate member 42 and a cooperating generally cylindrical member 43. This cylindrical member is urged against the plate member by a spring 44 which contacts pusher member 45 engaging the left-hand end of the cylindrical member 43, as the parts are viewed in FIGURE 2. In order to prevent rotation of the cylindrical member, it is provided with a pair of diametrically opposed slots 46 through which the stem 35 of the on-off valve passes.

The right-hand end of the cylindrical member 43, again speaking with respect to the position of the parts as shown in FIGURE 2, has a relatively large opening providing a thin plate-like portion 43a immediately adjacent the plate member 42; and, as may be best seen in FIGURE 4, this thin plate-like portion has an opening 43b punched therethrough The plate member 42 similarly has a thin plate-like portion 42a having an opening 42b formed therethrough generally in registry with the opening 43b. The plate member 42 is slidable (vertically in the position of the parts as shown in FIGURE 2) and adapted to be manually adjusted to vary the amount of registry of the openings 42b and 43b, thus varying the size of the flow control orifice and yet at all times leaving it "open" in the sense that there is no central needle valve member.

In the particular embodiment illustrated, adjustment of the plate member 42 is effected by having a cylindrical lower stem portion 42c threaded into the interior of a cylindrical member 46 which in turn is threaded into the housing 30 with a thread of different pitch than that with which it is threaded to the stem member 42c. This differential thread arrangement provides for very small changes in registry of the openings 42b and 43b upon rotation of the member 46. While the openings are here shown as diamond shaped, the shape of the non-registering portions is not critical, whereas the portions in registry providing the flow orifice, particularly in the smaller amounts or registry of the openings, preferably should be so shaped as to approximate a square, as by having the 90° V-shape illustrated. In a satisfactory embodiment of this valve, the flow control openings are one-sixteenth of an inch square, although at normal flow control rates and pressures they might be registry only to an extent providing an opening about .020" square, for example.

In order to minimize the effect upon flow rate of changes in viscosity of the liquid the plate sections in which these openings are formed should be quite thin, preferably of the order of a few thousandths of an inch thick. For best results the plate sections should each not be more than 50 thousandths of an inch thick, and preferably less than 20 thousandths of an inch thick, plates having a thickness between 3 thousandths of an inch and 10 thousandths of an inch having proved very satisfactory in operation. In order to have substantially the entire effect upon rate of flow achieved in this thin, open orifice, the passageways on each side thereof should have dimensions providing cross-sectional areas at least several times that of the maximum control orifice area which would be used. When the on-off valve 33 is in open position, all flow passage areas to the regulating orifice are at least several times that of the area of the orifice; and the outlet flow passage 47 to a delivery tube or line also provides a relatively large area, as by being connected to a feed tube having an internal diameter of ⅛ inch. While the two confronting surfaces about the openings 42b and 43b are urged tightly into engagement by the spring 44, any chance of leakage around this orifice is obviated by use of O-ring seals 48 and 49. Similarly, the member 45 is provided with an O-ring seal 50.

In order to prevent drying of the paint in or around the variable open orifice, it is preferable to arrange the system so that liquid paint is held in such manner as to completely fill the valve and the delivery conduit when paint delivery from that particular valve is terminated. In commercial practice, for example, the delivery conduit 26 (shown in FIGURE 1) would preferably be relatively short, as 8 or 10 inches in length, terminating in a capillary-sized delivery orifice of $\frac{1}{16}$ inch in diameter or slightly less through which paint would be delivered onto the rotating atomizing device 12. When the on-off valve 33 is in closed position, liquid paint would then be held in all passageways above this valve and in the delivery conduit by reason of the fact that in the absence of pressure paint would not flow through the capillary-sized delivery opening. This obviates drying out of the paint and clogging of the valve even if paint delivery through this particular valve should not be initiated again for a substantial period, as for a matter of hours.

The system heretofore described for the first time makes it practical to do multicolor electrostatic painting from a single atomizer. In the past electrostatic painting systems have used constant displacement pumps in order to get accurate control of the rate of paint delivery. It is impossible to locate a plurality of such pumps, or even a single pump, close enough to the atomizing device to sufficiently minimize the amount of paint between the pump and the atomizing device when the pump is shut off. When such a pump was located any substantial distance from the spray device, there would be a considerable amount of paint in the hose leading to the spray device, and this would settle and result in a very poor initial color match when delivery of that particular paint was resumed. Furthermore, during periods of non-operation such pumps frequently permit the paint to seep back down the line, so that the lines do not remain full and must be refilled again when the pump is started, making it impossible to have an accurately timed on-off operation. The flow control system heretofore described, with the valves arranged within 8 or 10 inches of the atomizing device and the feed tubes having only one-eighth of an inch internal diameter, makes it possible to have as little as 2 cubic centimeters of paint between the on-off valve and the discharge orifice; and the feed tube is kept full, so that reinitiation of spraying of that particular paint can be accurately timed. Moreover, the fact that there is such a small quantity of paint beyond the on-off valve results in such a small initial deposit of paint, even if it has settled some, that subsequent paint covers the initial deposit and results in a satisfactory and uniform color in the finished coat.

Most prior painting systems have employed guns with needle valves for controlling the rate of flow of paint. In these systems, the paint was supplied under pressure from a circulating line or from a paint pot, and it was considered necessary to have a fluid regulator in the line. In order to minimize clogging in the narrow annular orifice of the needle valve, it was necessary to adjust the valve opening to the widest setting practicable, which in turn necessitated reducing the pressure of the paint to a low level. In such pressure systems, the circulating line or pot pressure was usually at least of the order of 15 to 20 pounds per square inch, and the pressure at the output of the fluid regulator was generally 2 to 3 pounds per square inch. The "open" orifice valve avoids clogging even at relatively small orifice openings, so that a higher paint pressure can be used. This not only eliminates the need for fluid regulators in the liquid lines, but is of particular importance in situations where the elevation of the spray device is changed materially during operation. Some painting systems mount the rotating atomizing device on a reciprocator having, for example, a vertical stroke of 5 feet. With the open orifice valve heretofore described, the paint can be placed under a pressure of 50 or 60 pounds per square inch with the clogging problem essentially eliminated even though the orifice area would be very small. Since change in rate of flow through such a small orifice varies substantially as the square root of the change in pressure, the approximate 2½ pounds of change in pressure resulting from the 5 foot change in elevation would, under such circumstances, result in only about a 2% change in rate of atomization of the paint, a change well within normal painting tolerances.

While the adjustable orifice illustrated and described is provided by openings in adjacent plates which are each only a few thousandths of an inch thick, it will be understood that the important factor in securing insensitivity to viscosity changes is having a relatively thin wall around the orifice Accordingly, it is to be understood that this can be provided by using thicker plates suitably beveled toward the adjacent surfaces, although flat plates have the advantage of not changing wall thickness if they are worn or abraded away, as by the paint flow. While the pair of confronting 90° V-shaped sections illustrated provide a square at any size opening to which the orifice may be adjusted, it will be understood that one dimension can be more than the other provided neither dimension transverse to the direction of flow is at any time less than 3 thousandths of an inch, and preferably not less than 5 thousandths of an inch. The insensitivity to viscosity change of the valve illustrated, with plates each about .004″ thick, is such that with a particular paint and an adjustment of the valve providing 112 cubic centimeters per minute flow to the atomizing device, an increase in temperature from 70° F. to 90° F. resulted in a flow increase of only 4%. Two different needle valves of the type heretofore used in painting systems, on the other hand, showed flow rate increases of 33 to 40% upon the same change in temperature of the same paint.

Another representative system in which the advantages of this invention may be utlized is illustrated in FIGURE 5. Paint in a reservoir or paint pot 60 has air under pressure thereover, as by having air admitted to the top of the pot from an air line 61 through an air pressure regular 62. Paint at this regulated pressure (as for example 20# or more) is thus supplied through conduit 63 (which extends almost to the bottom of the paint pot) to valve 64, so that the rate of paint delivery is a function of the pressure of the paint and the effective opening of the orifice in the valve 64. The desired amount of paint is thus delivered through a flexible conduit or hose 65, which also carries the high voltage lead from the high voltage power supply 66, to the hand-gun 67. This is of a type known in the art, having a rotating atomizing device 68 adapted to have a high potential electrostatic atomizing and depositing field exist between it and a grounded article 69 which is being coated. In this system initiation and termination of paint flow are effected by an on-off valve in the hand-gun operated by the trigger 70, as will be hereinafter more fully described, so that the valve 64 comprises only an adjustable open orifice in this case.

Referring now more particularly to FIGURE 6, a generally cylindrical member 71 is spring urged so that its end face contacts plate member 72. Each of these members have thin plate sections with openings of the character heretofore described in connection with the valve shown in FIGURES 2–4; and the position of the plate member is adjusted by the manually rotatable knob 73 to vary the amount of registry of the openings and thus the effective size of the thin plate open orifice provided. Paint supplied to the inlet opening 74 of the valve is thus delivered to the outlet opening 75 in an amount controlled by the pressure of the paint and the effective size of the control orifice. The seals and other details are generally similar to those heretofore described, except that in this valve only a single screw-thread is used to determine the amount of registry of the openings, and is so arranged that the entire desired variation is obtained within 360° rotation of the knob 73, so that this may be calibrated conviently by a single scale.

Referring now more particularly to FIGURE 7, the valving portion of the hand-gun 67 is illustrated in detail. Paint entering the hand-gun through the passageway 76 must pass the valve element 77 in order to flow through the passageway 78 leading to the rotating atomizing device. The stem of the valve element is movable through the packing 79, and a spring 80 urges the valve to closed position as illustrated in FIGURE 7. When it is desired to initiate paint flow movement of the trigger 70 moves the valve element 77 off of its seat 81 and permits flow of paint. Except for a possible spotting or touch-up operation, the operator would in all cases move the trigger back to a position opening the valve fully so that paint flow would then be regulated by the adjustment of the valve 64, and would be relatively insensitive to viscosity variations. It is also to be understood that while a thin orifice is less sensitive to pressure variations than a needle valve, it provides sufficient variation that in many cases a fixed thin plate orifice may be used with such a hand-gun, as for example in the gun itself, with no need of adjustability of the orifice size. With a given orifice, for example, variation of the air pressure in the pot from 5 pounds to 60 pounds varies paint flow from about 65 cubic centimeters per minute to 225 cubic centimeters per minute.

The system of paint flow control disclosed in this application, with its thin open orifice valve, provides low sensitivity to viscosity changes, mild sensitivity to pressure changes, and non-clogging characteristics over a wide range of orifice sizes. These and other features of the systems heretofore described provide an improved spray painting system, with elimination of large and relatively expensive units heretofore considered necessary in spray painting.

While we have shown and described certain embodiments of our invention, it is to be understood that it is

We claim:
1. Apparatus for controlling flow of a liquid, comprising a housing having a bore, a plate-like valve member extending across said bore, a second valve member slidable in said bore, said second valve member being hollow and having a thin end wall engaging said plate-like valve member, said end wall and plate-like valve member being provided with valving openings, means urging said second valve member longitudinally of said bore toward the plate-like valve member, and means for moving said plate-like valve member transversely of said bore to vary the registry of said openings, said housing having a passage communicating with the interior of the second valve member.

2. Apparatus as set forth in claim 1 with the addition of an on-off valve located in said passage.

3. Apparatus as set forth in claim 2 with the addition that said passage is coplanar with said bore and extends laterally therefrom; said second valve member extending across the passage and being slotted to provide communication between its interior and the passage; said urging means being a spring acting on that end of the second valve member remote from said end wall; said on-off valve comprising a seat in said passage and a reciprocable valve member having a stem which extends through slots in said hollow valve member and beyond the same into operative association with a control means; said control means being power-operated and adapted for remote control.

4. Apparatus as set forth in claim 2 with the addition that said passage is coplanar with said bore and extends laterally therefrom; said second valve member extending across the passage and being slotted to provide communication between its interior and the passage; said urging means being a spring acting on that end of the second valve member remote from said end wall; said on-off valve comprising a seat in said passage and a reciprocable valve member having a stem which extends through slots in said hollow valve member and beyond the same into operative association with a control means.

5. Apparatus as set forth in claim 2 with the addition that said passage is coplanar with said bore and extends laterally therefrom; said second valve member extending across the passage and being slotted to provide communication between its interior and the passage; said urging means being a spring acting on that end of the second valve member remote from said end wall.

References Cited by the Examiner

UNITED STATES PATENTS

| | | | |
|---|---|---|---|
| 562,410 | 6/1896 | Moon | 158—118 |
| 2,513,081 | 6/1950 | Clark et al. | 239—307 |
| 2,540,056 | 1/1951 | Robinson | 251—286 |
| 2,618,576 | 11/1952 | Brown et al. | 117—104 |
| 2,672,844 | 3/1954 | Flint | 118—315 |
| 2,754,228 | 7/1956 | Bede | 117—105.1 |
| 2,758,945 | 8/1956 | Widmayer | 117—104 |
| 2,780,232 | 2/1957 | Ney | 251—206 X |
| 2,827,260 | 3/1958 | Jordan | 251—326 |
| 2,835,468 | 5/1958 | Sparks | 251—326 X |
| 2,838,066 | 6/1958 | Harris | 251—326 X |
| 2,883,148 | 4/1959 | Williams | 251—205 |
| 2,893,893 | 7/1959 | Crouse | 117—93 |
| 2,893,894 | 7/1959 | Ransburg | 117—93 |
| 2,915,023 | 12/1959 | Rapaport | 107—31 |
| 2,926,106 | 2/1960 | Gauthier | 118—626 X |
| 2,937,656 | 5/1960 | Evans et al. | 251—205 X |
| 2,951,499 | 9/1960 | Singer | 251—121 X |
| 3,055,592 | 9/1962 | Probst | 118—626 X |

MORRIS KAPLAN, *Primary Examiner.*

UNITED STATES PATENT OFFICE
CERTIFICATE OF CORRECTION

Patent No. 3,320,975　　　　　　　　　　　　　　　　May 23, 1967

James W. Juvinall et al.

It is hereby certified that error appears in the above numbered patent requiring correction and that the said Letters Patent should read as corrected below.

Column 2, line 53, for "suppplied" read -- supplied --; column 3, line 39, for "preventin" read -- preventing --; column 4, line 10, for "might be registry" read -- might be in registry --; column 6, line 39, for "conviently" read -- conveniently --; line 61, for "given orifice" read -- given fixed orifice --; column 8, line 34, for "118-626X" read -- 117-93 --; line 37, for "118-626X" read -- 239-15 --.

Signed and sealed this 9th day of January 1968.

(SEAL)
Attest:

Edward M. Fletcher, Jr.　　　　　　　　　　　EDWARD J. BRENNER
Attesting Officer　　　　　　　　　　　　　　Commissioner of Patents